United States Patent
Vanhatalo

(10) Patent No.: US 7,522,198 B2
(45) Date of Patent: Apr. 21, 2009

(54) ELECTRONIC DEVICE, A METHOD AND A PROGRAM PRODUCT FOR DETERMINING A SHOW ZOOM RATIO FOR AN IMAGE

(75) Inventor: Aki Vanhatalo, Hampshire (GB)

(73) Assignee: Nokia Corporation, Espoo (FI)

( * ) Notice: Subject to any disclaimer, the term of this patent is extended or adjusted under 35 U.S.C. 154(b) by 818 days.

(21) Appl. No.: 11/111,283

(22) Filed: Apr. 20, 2005

(65) Prior Publication Data
US 2006/0238628 A1 Oct. 26, 2006

(51) Int. Cl.
*H04N 5/262* (2006.01)
(52) U.S. Cl. .................................. 348/240.99
(58) Field of Classification Search ............. 348/240.99
See application file for complete search history.

(56) References Cited

U.S. PATENT DOCUMENTS

| | | | | |
|---|---|---|---|---|
| 5,960,154 | A * | 9/1999 | Ohnishi et al. | 386/117 |
| 6,037,939 | A * | 3/2000 | Kashiwagi et al. | 715/798 |
| 6,151,070 | A * | 11/2000 | Sato et al. | 348/240.99 |
| 6,529,234 | B2 * | 3/2003 | Urisaka et al. | 348/211.99 |
| 2005/0078203 | A1 * | 4/2005 | Akutsu | 348/240.99 |
| 2006/0170793 | A1 * | 8/2006 | Pasquarette et al. | 348/240.99 |

\* cited by examiner

*Primary Examiner*—Tuan V Ho
*Assistant Examiner*—Kent Wang
(74) *Attorney, Agent, or Firm*—Harrington & Smith, PC

(57) ABSTRACT

An electronic equipment is disclosed, which includes screen means for showing an image by using the set show zoom ratio and processor means for performing zooming of the image in a selected zooming direction in order to show the image on the screen means, in which zooming operation a such of fit-to-screen zoom ratio is arranged to be determined by using of which the image is to be fitted on the screen means and in which part of the possible show zoom ratios are arranged to form default zoom ratios changing in a set manner in order to deal out successive zooming operations in the selected zooming direction. By the processor means is arranged to be determined the difference between the fit-to-screen zoom ratio and the next default zoom ratio in the selected zooming direction and based on the difference and the zooming direction is arranged to be set the said show zoom ratio.

23 Claims, 6 Drawing Sheets

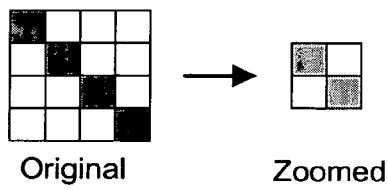
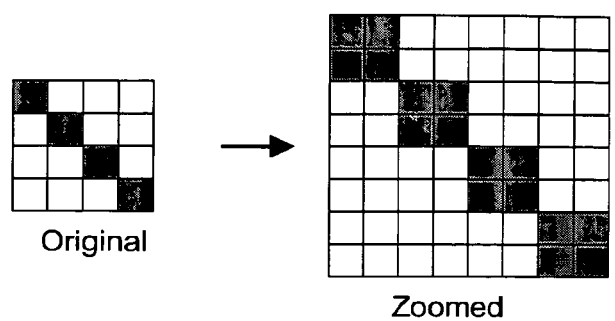
Fig. 8a
Fig. 8b

ELECTRONIC DEVICE, A METHOD AND A PROGRAM PRODUCT FOR DETERMINING A SHOW ZOOM RATIO FOR AN IMAGE

FIELD OF THE INVENTION

The invention concerns electronic device, which includes screen means for showing an image by using the set show zoom ratio and processor means for performing zooming of the image in a selected zooming direction in order to show the image on the screen means, in which zooming operation a such of fit-to-screen zoom ratio is arranged to be determined by using of which the image is to be fitted on the screen means and in which part of the possible show zoom ratios are arranged to form default zoom ratios changing in a set manner in order to deal out successive zooming operations in the selected zooming direction. In addition, the invention also concerns method and a corresponding program product.

BACKGROUND OF THE INVENTION

Digital photos are easy to zoom in certain zoom ratios. Some examples of these are presented in FIGS. 8a and 8b. These ratios may form a special series that is used as a default when performing zooming in the selected zooming direction. Some examples of these default or user interface ratios, depending on term choice to be used, are $2^n:1$ (2:1, 4:1, 8:1, etc), 1:1, and $1:2^n$ (1:2, 1:4, 1:8, etc) ratios. These set of ratios are easy because a group of pixels can be easily shrunk into one pixel simply by calculating their average (zoom-out, FIG. 8a), or enlarged simply by duplicating the pixel (zoom-in, FIG. 8b). These zoom ratios also maintain the visible quality of the image. These zoom ratios are called the "easy" or default or user interface zoom ratios in connection with this document.

If some other zoom ratios are used (e.g., 1:3) some problems arise. The user is either going to see jagged edges if nearest neighbour interpolation is used. On the otherwise the software is going to have to use CPU-intensive calculations to achieve high visual quality if bicubic interpolation is used. In general, the different interpolation methods are quite well known for the one versed in the art.

However, since device screens contains a fixed number of pixels in each screen directions, a device will often have to use some other zoom ratio (than mentioned above) to fill the entire screen. A basic example of this situation is described in FIGS. 3 and 4b. For example, when filling a screen 11 having 176×208 pixels with an 640×480 original image IM(1:1), the device will have to use a zoom ratio of 27,5% (left side part of FIG. 4b). From this fit-to-screen zoom ratio ZF, many devices (or software) allow user to zoom further into the image (right side part of FIG. 4b). It makes sense to use the "easy" zoom ratios as default zoom ratios when zooming due to the reasons mentioned above (quality and processing capability). So, if the user zooms in from 27,5% (=ZF), the device would pick the next zoom ratio (=ZRN) of the set of the "easy" zoom ratios, i.e., 50% (1:2).

However, sometimes when beginning from the fit-to-screen zoom ratio ZF the zoom increase to the next "easy" zoom ratio ZRN is very small. This prior art example is described in FIG. 7. Due to this reason the user is not going to see much difference between zoomed images IM(ZF) and IM(ZRN) (=image objects IO). The next "easy" zoom ratio ZRN was used, regardless of whether it offered very little visible difference to the user. So zoom, for example, in from ZF=11% (left side part of FIG. 7) goes to ZRN=12,5% (right side part of FIG. 7). However, the user will have to wait for the zooming to be completed. This is very frustrating in the view of user-friendliness because this takes time and, however, the result between the viewed images IM(ZF) and IM(ZRN) is not so noticeable on the screen 11 due to the small zooming effect.

SUMMARY OF THE INVENTION

The purpose of the present invention is to bring about a way to zoom images with electronic device. The characteristic features of the electronic device according to the invention are presented in the appended Claims 1 and 23 and the characteristic features of the method are presented in Claim 9. In addition, the invention also concerns a program product, whose characteristic features are presented in the appended Claim 17.

In the invention, when the end user zooms, the invention instructs the processor of the device how to select a smart zoom step that there is always a benefit to the end user when he or she performs the zoom-in or zoom-out function, or in more generally, performs zooming in the selected zooming direction.

The electronic device according to the invention includes a screen for showing an image by using the set show zoom ratio and a processor for performing zooming of the image in a selected zooming direction in order to show the image on the screen, in which zooming operation a such of fit-to-screen zoom ratio is arranged to be determined by using of which the image is to be fitted on the screen and in which part of the possible show zoom ratios are arranged to form default zoom ratios changing in a set manner in order to deal out successive zooming operations in the selected zooming direction. By the processor of the device is arranged to be determined the difference between the fit-to-screen zoom ratio and the next default zoom ratio in the selected zooming direction and based on the difference and the zooming direction is arranged to be set the said show zoom ratio.

Furthermore, the invention concerns also method for determining a show zoom ratio for an image in order to show the image on a screen in which part of the possible show zoom ratios form default zoom ratios changing in a set manner to deal out successive zooming operations of the image in a selected zooming direction and in which method for the image is determined such a fit-to-screen zoom ratio by using of which the image is to be fitted on the screen, for the image is set the show zoom ratio depending on the selected-zooming direction and the image is shown on the screen using the set show zoom ratio.

In the method according to the invention in connection with the zooming operation the difference between the said fit-to-screen zoom ratio and the next default zoom ratio in the selected zooming direction is determined and based on the difference and the zooming direction is set the said show zoom ratio.

Furthermore, the program product for zooming images includes a storing means and a program code executable by a processor and written in the storing means. Program code includes first code means configured to determine for the image such a fit-to-screen zoom ratio by using of which the image is arranged to be fit on a screen and second code means configured to show the image on the screen by using the set show zoom ratio and in which part of the possible show zoom ratios are arranged to form default zoom ratios changing in a set manner to deal out successive zooming operations in a selected zooming direction.

The program code includes third code means configured to determine the difference between the said fit-to-screen zoom ratio and the next default zoom ratio in the selected zooming direction and fourth code means configured to set the said show zoom ratio based on the determined difference and the zooming direction in question.

Owing to the invention, numerous advantages to do image showing and viewing are achieved. A first advantage is achieved in devices in which the zooming operation is fairly slow. A one example of this kind of equipment is a mobile device. If the invention is used, the user does not have to wait unnecessarily for a very small zoom difference, but will get a significant difference each time when the user zooms images. Without using the invention, zooming would be quite annoying to the end user.

According to one embodiment the default zoom ratios may be arranged to consist of zoom ratios which are achieved by calculating an average of the pixels of the image or by duplicating the pixels of the image. However, the basic idea of the invention doesn't limit the use of the invention to some special zoom ratios but the default zoom ratios may be even stepless. According to one example the default zoom ratios may be arranged to consist of zoom ratios which are, depending on the selected zooming direction at each time, $2^n:1$ or $1:2^n$, in which=0, 1, 2, 3, . . . By using and selecting these default zoom ratios in a surprisingly manner in connection with the invention is achieved very quick zooming experience for the end user.

According to one other embodiment for the difference between fit-to-screen and the next default zoom ratios is set a threshold value. According to one embodiment the threshold value is arranged to be 1-50%, such as, for example, 10-45%, or even more precisely 25-35%. Using this kind of value the user gets always the significant advantage when performing zooming. User sees considerable difference in zooming and now the zooming experience is no more frustrating.

The selection of the show zoom ratio according to the invention may be applied in several phases. Even the fit-to-screen operation may be performed in the manner according to the invention. Also, the invention may be applied in the zooming that is performed after the image is first fit-to-screen. The invention may be applied both in connection with a zoom-in and a zoom-out zooming directions.

The invention is particularly suitable for zooming of images that are too large for the device's own limited display. This is the most general case when the zooming is annoying for the end user in the sense of the invention. However, this case doesn't exclude other possible situations, in which with the invention are achieved advantages.

Other characteristic features of the invention will emerge from the appended Claims, and more achievable advantages are listed in the specification.

BRIEF DESCRIPTION OF THE DRAWINGS

The invention, which is not limited to the embodiments to be presented in the following, will be described in greater detail by referring to the appended figures, wherein FIG. 7 shows an application example of the zooming according to prior art and FIGS. 8a, 8b show examples of zooming applying default zoom ratios which are easy to perform.

DETAILED DESCRIPTION OF THE INVENTION

Figure 1:
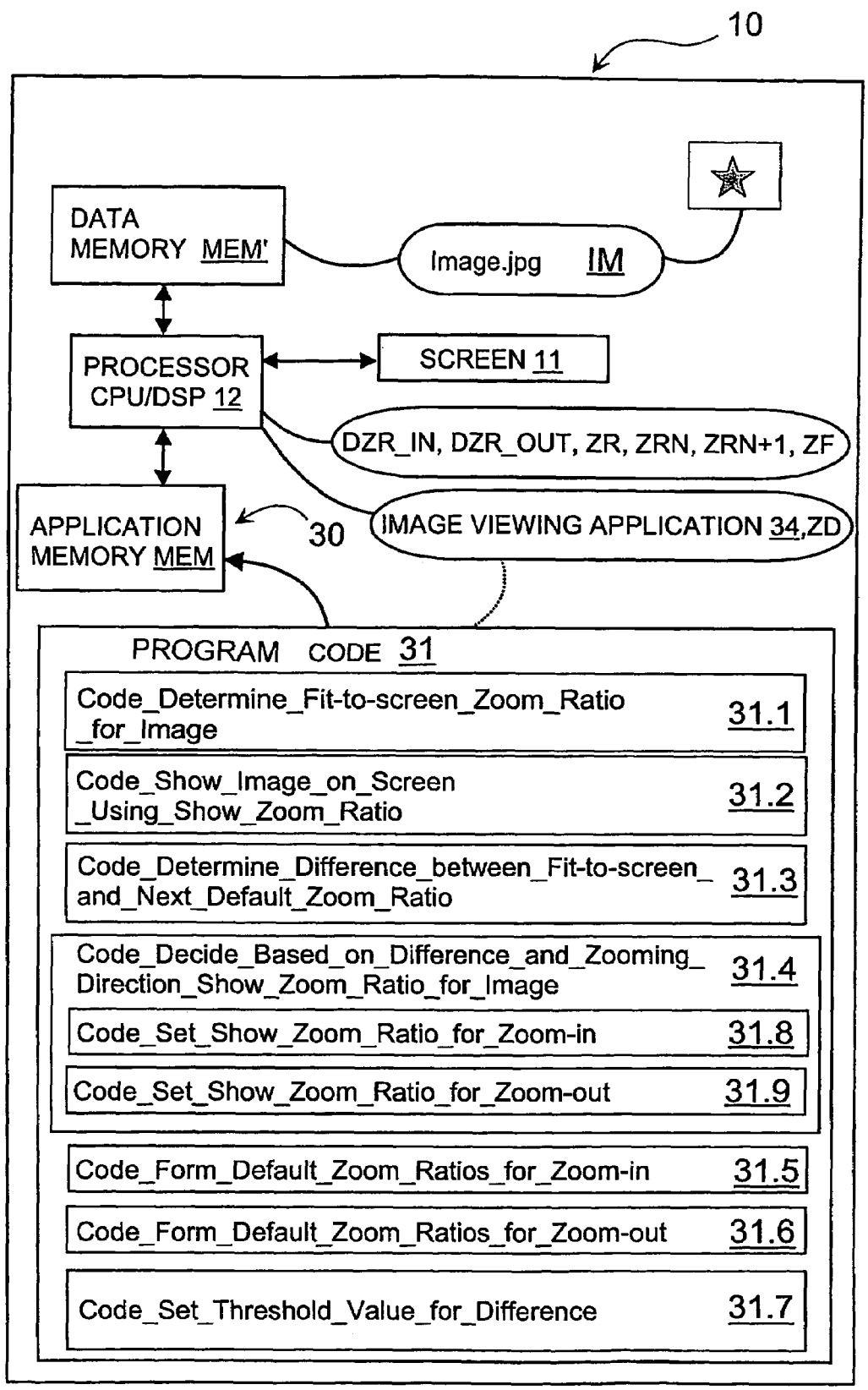
FIG. 1 is a rough schematic view of a basic application example of the device and the program product to be arranged in connection with the device according to the invention.

FIG. 1 shows an example of portable electronic device 10 according to the invention. The device 10 may be, for example, mobile device, such as, for example, a mobile phone, PDA device (Personal Digital Assistant) or some equivalent intelligent communication device ("smart device"). Of course, the device may also be a digital camera without any special communication features.

In its basic form the device 10 may include screen 11 and processor 12. The screen may include a color display element 11, known as such, or corresponding by means of which can be show and view images IM. The processor may include one or several processor(s) unit(s) 12 or corresponding by means of which are carried out the functions of the device 10 in many relations. The device 10 may also have memory MEM' in which may be stored different kind of data, such as, for example, images IM.

Next the device 10 will be described in a manner that is more focused to the invention. For the skilled person, it is well known that the device 10 may also include other such functionalities, which are not required to describe in this application context. In addition, the function entity of the device 10 described hereinafter can, of course, take care out of many other matters and functions than which are considered to be relevant to describe in this connection in order to illuminate the basic idea of the invention. For the skilled person it is obvious that at least part of the functions, operations and calculations of the invention may be performed in a program level executed by the processor 12. Of course, the implementations in which part of the operations are performed on program level and part of the operations are performed on the hardware level, is also possible. Next in the relevant points are referred to these program code means by means of which the device operations may be performed according to one embodiment. The program code means 31.1-31.9 forming the program code means 31 are presented in FIG. 1.

On the screen 11 the image IM can be shown using the set show zoom ratio ZD. The show zoom ratio ZD can be selected rather arbitrary. It can be set, for example, to be so large that only the part of the image IM is shown on the screen 11. Also, it can be set to be such that the image IM is presented only very small on the screen 11. When the desired show zoom ratio ZD has been selected or decided the processor 12 performs the zooming operation of the image IM in order to show the image IM on the screen 11 by using this particular show zoom ratio ZD.

At least part of the possible show zoom ratios ZD may form a default zoom ratio series in order to deal out successive zooming operations of the image IM in the selected zooming direction. These zoom ratios ZD may also be understood as user interface zoom ratios depending on the term choice. The zoom ratios DZR_IN, DZR_OUT may belong to the default or user interface zoom ratio groups, which device 10 may have several in order to perform zoomings in different zooming directions. The zoom ratios DZR_IN, DZR_OUT may be discrete values and they can change i.e. increase or decrease in a set manner. The zoom ratios DZR_IN, DZR_OUT belonging to the default zoom ratio sets can be used consecutive in default manner, for example, in the case when the user zooms image IM being far away from the fit-to-screen zoom ratio ZF. In that case the zooming may be performed according to the order of these default zoom ratios DZR_IN, DZR_OUT.

According to one embodiment, the user interface zoom ratios DZR_IN, DZR_OUT can consist of zoom ratios, which are achieved by calculating an average of the pixels (<100% scaling) or by duplicating the pixels (>100% scaling). This kind of zoom ratios DZR_IN, DZR_OUT may be dub "easy" zoom ratios. In principle, any zoom ratio value (for example, "15%") is possible even they are not achieved in such an easy manner like the values achieved by the averaging or duplicating the pixels. For some user interface such zoom ratios may suit more suitable manner than the "easy" ratios described above and below. Due to this reason the term "default zoom ratio" DZR_IN, DZR_OUT may be understood in the context of the invention such a zoom ratio which the device 10 will use in the next zooming step if the invention is not used. This may be a default zoom ratio value DZR_IN, DZR_OUT chosen by the device 10 in an established manner or alternatively chosen by the user in a desired manner.

Next the invention is described in the case of JPEG images. However, the invention does not exclude other image formats to be applied but one versed in the art may adapt the invention to other image formats too. According to one embodiment the default zoom ratios DZR_IN, DZR_OUT may be so called "easy" zoom ratios already described prior, which form a suitable series of zoom ratios. JPEG will have four "easy" zoom ratios DZR_IN, DZR_OUT which are common with the normal scaling and which makes easy scaling values even easier. The zooming of the image IM between these zoom ratios DZR_IN, DZR_OUT takes place by the processor 12 in a fast and well manner due to the reasons described above.

If the selected zooming operation is zoom-in of the image IM on the screen 11, the default zoom ratios DZR_IN may then consist of zoom ratios which form is, for example, $2^n:1$, in which n=0, 1, 2, 3, . . . . This formation of the default zoom ratio series DZR_IN may be performed by the program code means 31.5.

If the selected zooming operation is zoom-out of the image IM on the screen 11, the default zoom ratios DZR_OUT may then be consist of zoom ratios which form is, for example, $1:2^n$, in which n=0, 1, 2, 3, . . . . This formation of the default zoom ratio series DZR_OUT may be performed by the program code means 31.6.

Still further, yet one possible zoom ratio, which can also set for the show zoom ratio ZD is so called fit-to-screen zoom ratio ZF. By using the fit-to-screen zoom ratio ZF determined by the processor 12 (program code means 31.1) the image IM that otherwise would not be suitable of its size for the screen 11 can be fit in its entirety on the screen 11. Of course, the fit-to-screen zoom ratio ZF depends on, for example, the size of the image IM and the size of the screen 11. The fit-to-screen zoom ratio ZF may be any real number value.

The general idea of the invention is that it selects the next show zoom ratio ZD to be used in the selected zooming direction in a smart way. In the method an algorithm code 31 is used that checks whether the difference Z' between the current zoom ratio and the next "easy" zoom ratio ZRN is large enough to perform. The current zoom ratio may be according to one embodiment the fit-to-screen zoom ratio ZF that is also the show zoom ratio ZD. If the difference Z' between comparable zoom ratios isn't large enough, the program code 31 instructs to skip that next zoom ratio ZRN, and pick the next "easy" zoom ratio ZRN+1 instead which would be the next in order in the selected zooming direction. Then, this next+1 "easy" zoom ratio ZRN+1 is set to be the show zoom ratio ZD.

In the same manner the invention can also be applied in the case when zooming procedure starts from some "easy" zoom ratio DZR_OUT. In this case the algorithm code 31 according to the invention checks whether the difference Z' between the fit-to-screen zoom ratio ZF and the next "easy" zoom ratio ZRN in order of the zooming direction is large enough to perform. If the difference Z' is insignificant the more convenient zoom ratio (for example, the fit-to-screen zoom ratio ZF) is used as show zoom ratio ZD.

For the difference Z' may be set a threshold or criterion value ZX. The threshold value ZX may be 1-50%, such as, for example, 10-45%, or even more precisely 25-35%. Using this kind of threshold value ZX the achieved difference between zooming is quite noticeable in the view of the end user. The threshold value ZX may be set by using the program code means 31.7.

Figure 2:
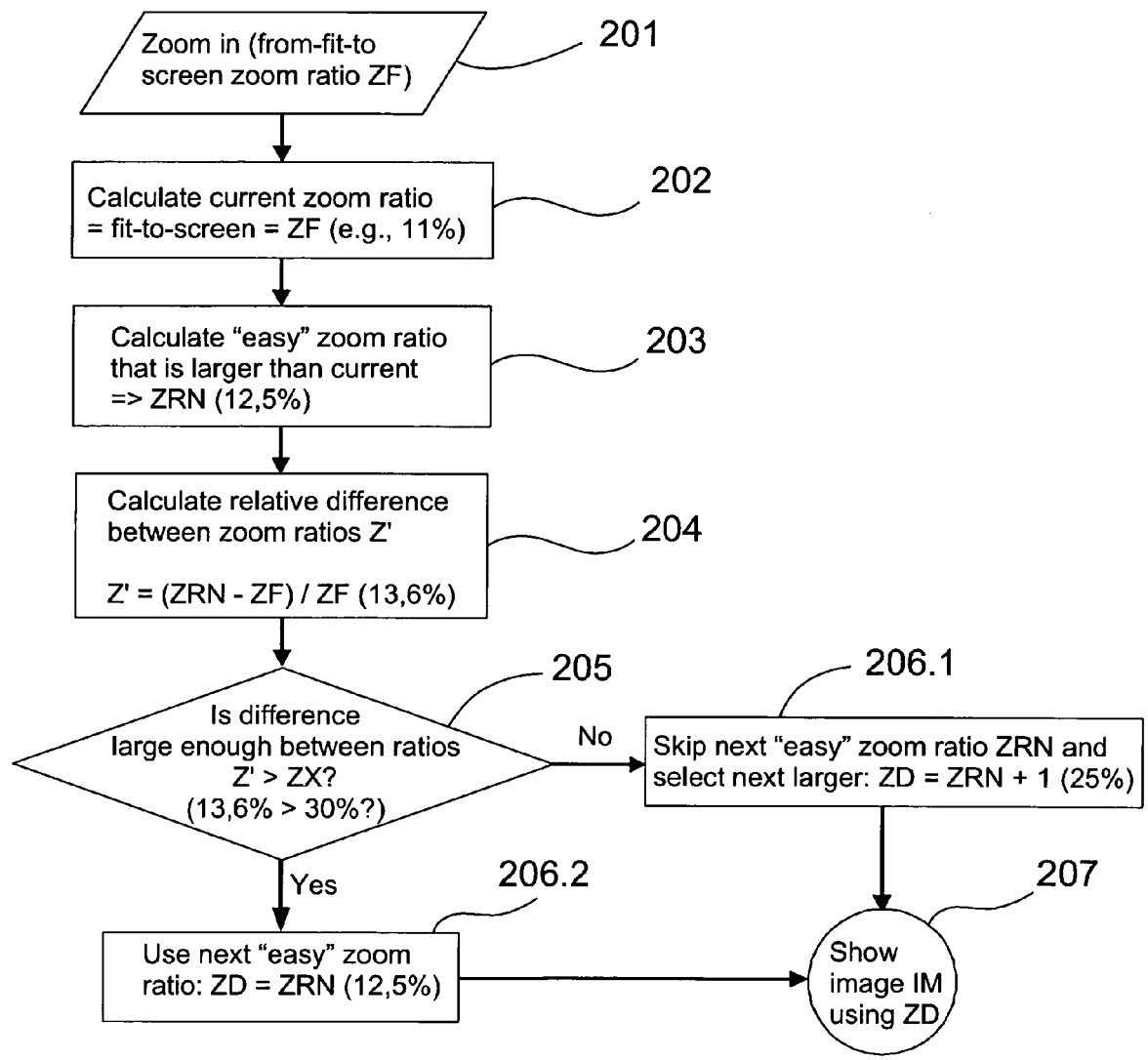
FIG. 2 shows a flowchart of the application example of the invention when performing zoom-in operation.
Figure 3:
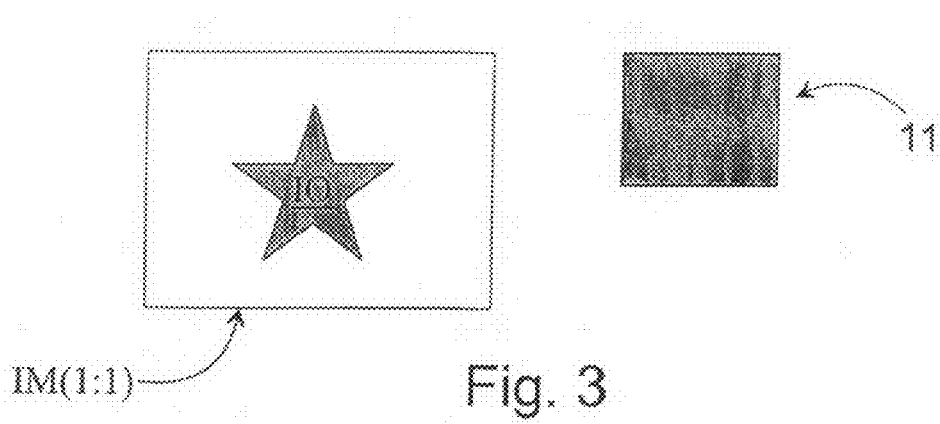
FIG. 3 shows an application example of the original image and display to which it should be fitted.
Figure 4A:
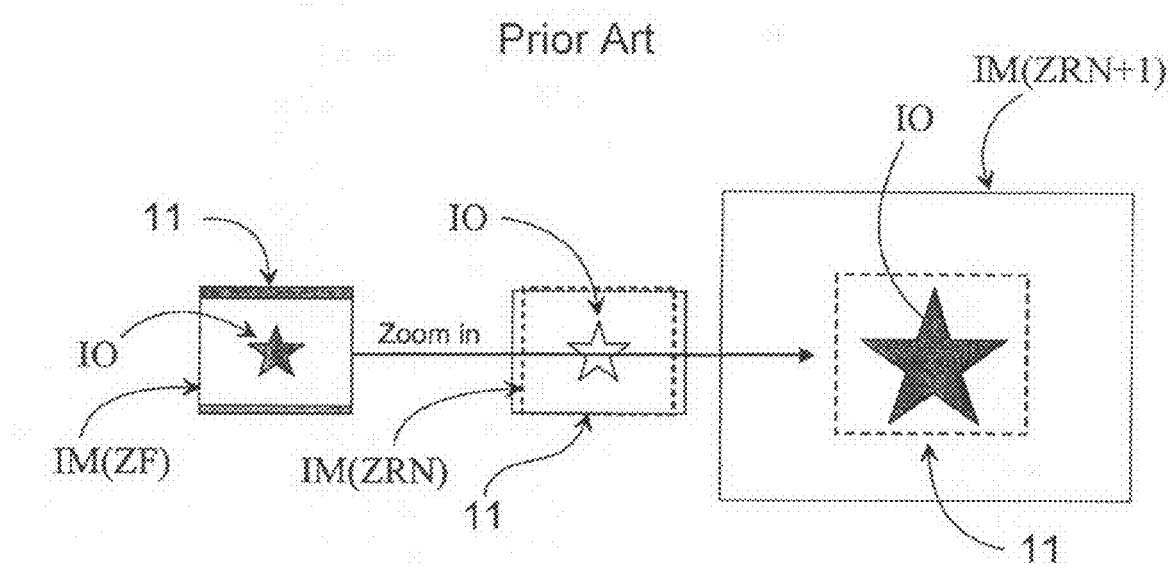
FIGS. 4a, 4b show application examples of the zoom-in operations when the invention is used.
Figure 4B:
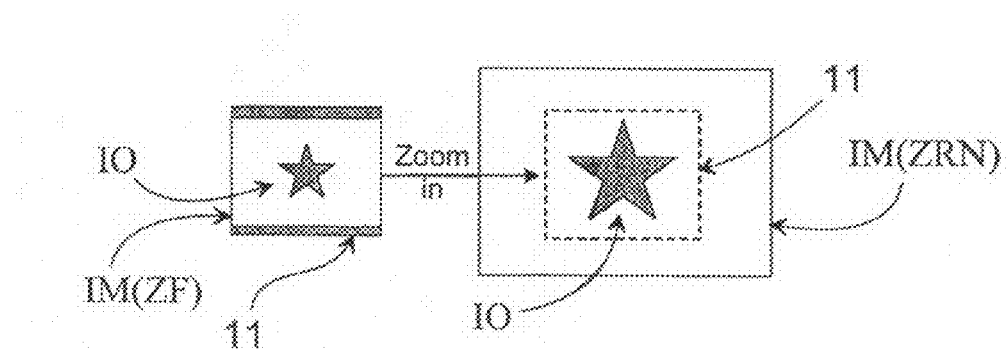

Next the method for determining the show zoom ratio ZD for the image IM in order to show the image IM on the screen 11 is described first in the case of zoom-in operation of the image IM with reference to the FIGS. 4a and 4b and with reference to the flowchart of the FIG. 2. Examples of the input image IM and the screen 11 of the device 10, are presented in FIG. 3. In this application example, for example, let's assume that the size of the original picture IM(1:1) is 1600×1200 pixels (=2 megapixels) and the size of the screen 11 of the device 10 is 176×208 pixels. The image IM(1:1) (here (1:1) means that image IM has its original size) may be, for example, received by the device 10 from the communication network (not presented). Because the image IM(1:1) is not formed with the camera means of the device 10 (not presented) there has to perform some fit-to-screen operations in order to fit the image IM(1:1) on the screen 11. Of course, the image IM(1:1) may also be imaged by the device 10.

In the FIG. 2 as a first stage 201, the oversized image IM(1:1) is fitted on the screen 11 by the processor 12 (code means 31.1). In this stage for the image IM(1:1) is determined such a fit-to-screen zoom ratio ZF by using of which the image IM(1:1) may be fitted on the screen 11 in its entirety or at least mainly. At stage 202 is determined by the processor 12 the current zoom ratio of the image IM(ZF), which is now this fit-to-screen zoom ratio ZF (here (ZF) means that the size of the image IM is fitted suitable for the screen 11). In this particular case the fit-to-screen zoom ratio ZF is 11%. Actually, the fit-to-screen zoom ratio would be 11% in horizontal direction and 17,3% in vertical direction. However, the smaller zoom ratio of these two zoom ratios may be chosen in order to fit and show the image IM(ZF) entirety on the screen 11 (left side portion of the FIG. 4a). This is performed by the program code means 31.2. Of course, for one versed in the art it is also possible to fit the image IM on the screen at least partly by using the other fit-to-zoom ratio calculated above (=17,3%). Due to this reason the term "entirety" may be understood in the context of the invention as "mainly entirety".

Because, it is intent in this case to perform zoom-in operation (so zoom-in is now the selected zooming direction), in the next stage 203 it is determined by the processor 12 the next default zoom ratio ZRN in the selected zooming direction according to which the zooming would be advantageously performed. Because, the user zooms in, this next "easy" zoom ratio ZRN being one member of the default zoom ratios DZR_IN is larger than current zoom ratio being now the fit-to-screen zoom ratio ZF. In this case this member ZRN of the default zoom ratio group is 12,5% (=8:1) (if this would be used as show zoom ratio, the image IM(ZRN) would be now in the centre portion of the FIG. 4a).

Next in stage 204 the smart zoom algorithm code 31 according to the invention that is executed by the processor 12 determines the difference Z' between determined and used fit-to-screen zoom ratio ZF and the determined next "easy" zoom ratio ZRN belonging to the series of special default zoom ratios (program code means 31.3). It is determined now that the difference Z' between these two zoom ratios ZF, ZRN is 13,6% (=(ZRN−ZF)/ZF)=(12,5%−11%)/11%)). Of course, other measures are also possible to apply in this determination. This relative difference method is just one example.

In the stage 205 is performed the comparison according to the invention (program code means 31.4, 31.8). In connection with the zooming operation the difference Z' between the fit-to-screen zoom ratio ZF and the next default zoom ratio ZRN in the selected zooming direction is determined and based on the difference Z' and the zooming direction in question is set the said show zoom ratio ZD. If the difference Z' is below the threshold value ZX set for it as a show zoom ratio ZD is used such default zoom ratio ZRN+1 which is greater in order than the default zoom ratio ZRN which would be the next in the selected zooming direction. The next default zoom ratio ZRN in the selected zooming direction is the nearest zoom ratio for the determined fit-to-screen zoom ratio ZF.

Thus, the smart zoom algorithm code 31 according to the invention is now configured in such way that it skips the zoom step to the next default zoom ratio ZRN in order of the selected zooming direction if the increase Z' between fit-to-screen zoom ratio ZF and the next default zoom ratio ZRN in order of the set of the zoom ratios which forms the default zoom ratio group DZR_IN is less than threshold ZX set for it. Now the threshold is set to be, for example, 30%. The condition 13,6%>30% is untrue and due to this reason the zoom algorithm code 31 goes directly to the next larger default zoom ratio ZRN+1 (=25%) in the selected zooming direction (stage 206.1) thus skipping the default zoom ratio ZRN (=12, 5%) which is next to the fit-to-screen zoom ratio ZF. In stage 206.1 for the image IM is set the show zoom ratio ZD depending on the selected zooming direction. Since the zooming direction is now zoom-in of the image IM and the condition of the stage 205 didn't fulfil, the show zoom ratio ZD is set now to be 25%. This may be performed by the program code means 31.8.

Next in stage 207 the image IM(ZRN+1) is shown on the screen 11 by using the show zoom ratio ZD set in stage 206.1 (program code means 31.2). As can be clearly seen from the FIG. 4a, the difference in size between the image object IO of images IM(ZF), IM(ZRN+1) is considerable. The size difference between image object IO in images IM(ZF), IM(ZRN) would be insignificant if the invention would not be used. Owing to the invention the difference Z' in the zooming effect is noticeable for the end user and image viewing experience is very enjoyable.

However, if in the comparison stage 205 would have been detected by the processor 12 (program code means 31.3) that the difference Z' between the current fit-to-screen zoom ratio ZF and the next default zoom ratio ZRN (12,5%) is clear, i.e. over the threshold value 30% set for it then a step to the stage 206.2 would be performed. In stage 206.2 for the image IM is set the show zoom ratio ZD which is now the default zoom ratio ZRN which is the next in order in the selected zooming direction that being now zoom-in of the image IM. This zoom ratio ZRN is the nearest zoom ratio for the fit-to-screen zoom ratio ZF. In this case the skipping of the next default zoom ratio ZRN would be caused too large difference to the zooming effect. The zooming situation of the stage 206.2 is described in FIG. 4b. Next in stage 207 the image IM(ZRN) is shown on the screen 11 by using the show zoom ratio ZD set for it in stage 206.2 (program code means 31.2). The size difference between image object IO in images IM(ZF), IM(ZRN) is now enough.

Figure 5:
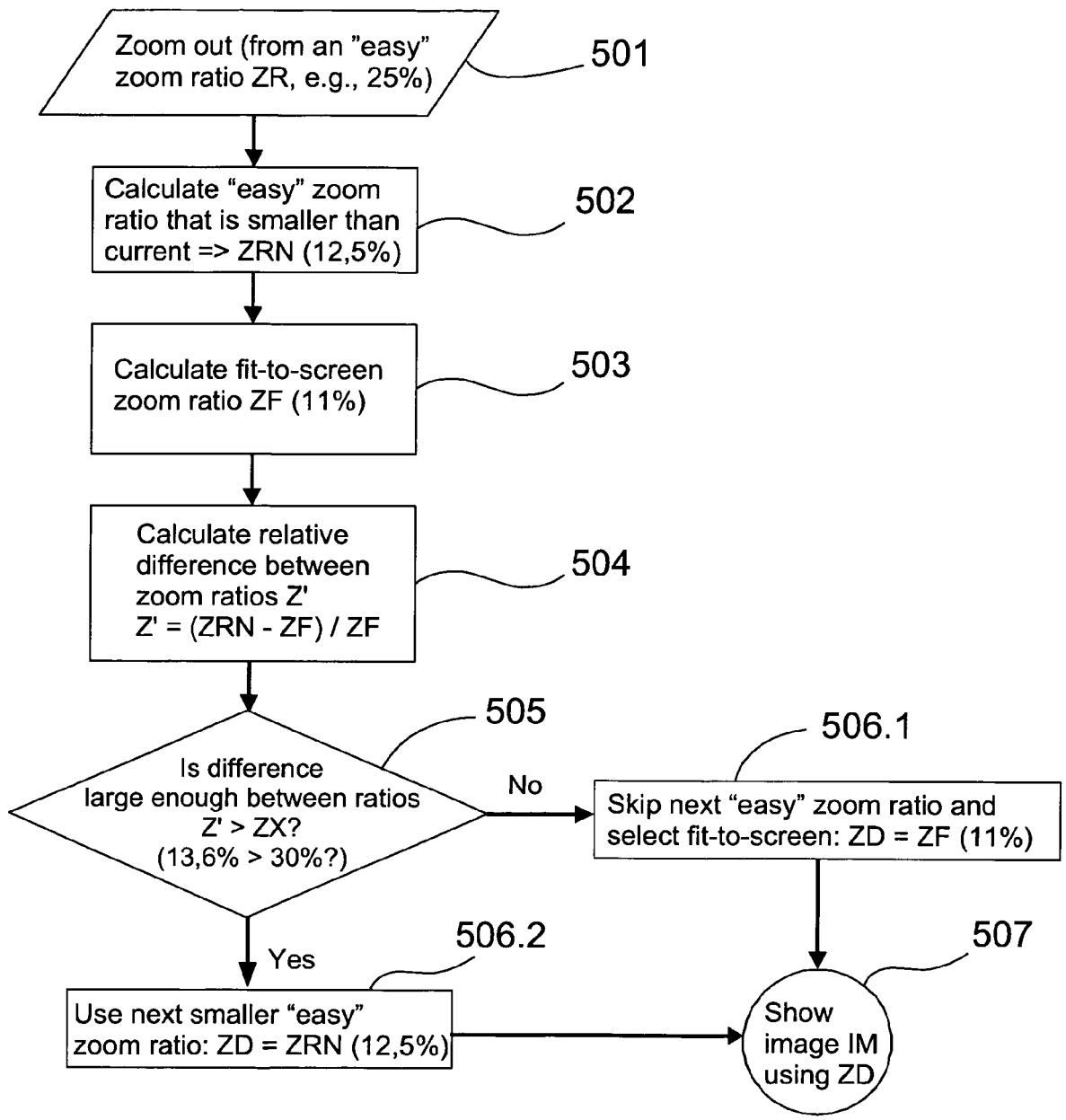
FIG. 5 shows a flowchart of the application example of the invention when performing zoom-out operation.
Figure 6A:
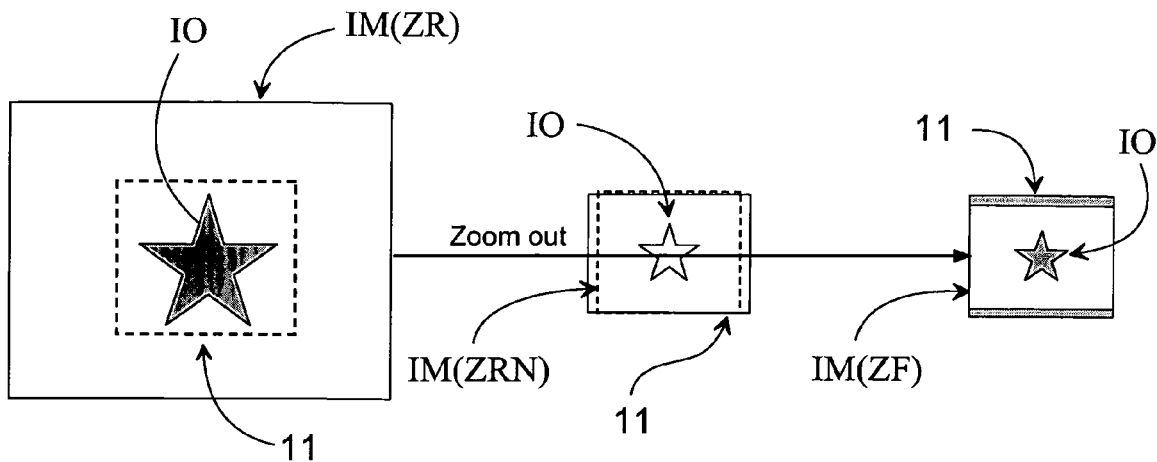
FIGS. 6a, 6b show application examples of the zoom-out operations when the invention is used.

Next the method for determining the show zoom ratio ZD for the image IM in order to show the image IM on the screen 11 is described in the case of zoom-out procedure of the image IM with reference to the flowchart of FIG. 5 and application example of FIG. 6a. The program code means 31.1-31.9 are equivalent with the embodiment above. In this case similarly, the user has in his or hers device 10 the image IM(1:1) which original size is disadvantageous for the screen size of the device 10. The user now views this image IM using his or hers device 10. The image IM is zoomed out on the screen 11. This initial situation is presented in the left portion of FIG. 6a. If the user now zooms out (from e.g. 25%) the algorithm code 31 would determine that the difference Z' between the next smaller "easy" default zoom ratio ZRN and the fit-to-screen zoom ratio ZF is too small to justify using the "easy" default zoom ratio ZRN which is next in order, and would jump directly to fit-to-screen zoom ratio ZF instead of that.

In FIG. 5 as the first stage 501 of this procedure, the zoom out operation desired by the user of the device 10 is detected. The image IM(ZR) is shown on the screen 11 by using the default zoom ratio ZR that is now, for example, 25% (program code means 31.2). This is presented in the left portion of FIG. 6a. Because, it is purpose in this embodiment to perform zoom-out action, in the next stage 502 it is determined by the processor 12 the next default zoom ratio ZRN according to which the zooming would be advantageously performed in the selected zooming direction. This may also be performed by program code 31. Because, the user zooms out, this next "easy" zoom ratio ZRN (=12,5%=8:1) being one member of the default zoom ratios is in this particular case smaller than the current zoom ratio ZR (=25%) by using of which the image IM(ZR) is now shown on the screen 11. If the next default zoom ratio ZRN would be used this situation is presented in the centre portion of FIG. 6a.

Next in stage 503 it is determined for the image IM such a fit-to-screen zoom ratio ZF by using of which the image IM may be fitted on the screen 11 in its entirety (program code means 31.1). In this example it is also 11% (if assumed that the image IM and device 10 are same like in the embodiment of FIG. 2, branch 206.1).

Next in stage 504 the smart zoom algorithm code 31 according to the invention and executed by the processor 12 determines the relative difference Z' between determined fit-to-screen zoom ratio ZF and determined next "easy" zoom ratio ZRN belonging to the group of special default zoom ratios DZR_OUT (program code means 31.3). It is determined now that, again, the difference Z' between these two zoom ratios is 13.6% (=(ZRN−ZF)/ZF)=(12,5%−11%)/11%)).

In the stage 505 it is performed the comparison according to the invention (program code means 31.4). In connection with the zooming operation the difference Z' between the fit-to-screen zoom ratio ZF and the next default zoom ratio ZRN in the selected zooming direction is determined and based on the difference Z' and the zooming direction in question is set the show zoom ratio ZD. Now the next default zoom ratio ZRN in the selected zooming direction is the nearest zoom ratio for the fit-to-screen zoom ratio ZF. If the difference Z' is below the threshold value ZX as the show zoom ratio ZD is used the determined fit-to-screen zoom ratio ZF.

The smart zoom algorithm code 31 is again configured in such way that it skips the zoom step to the next default zoom ratio ZRN if the decrease between determined fit-to-screen zoom ratio ZF and the next smaller default zoom ratio ZRN in order of the series of the special zoom ratios which forms the default zoom ratio group DZR_OUT is less than threshold set for it (now 30%). The condition 13,6%>30% is now untrue. This may be indicated by the program code means 31.4. Due to this reason step to stage 506.1 is taken according to which the zoom algorithm code 31 goes directly to the fit-to-screen zoom ratio ZF (=11%) thus skipping the next default zoom ratio ZRN which is next to the fit-to-screen zoom ratio ZF (=12,5%). In the stage 506.1 for the image IM is set-the show zoom ratio ZD depending on the selected zooming direction. Since the zooming direction is now zoom-out of the image IM and the condition of the stage 505 didn't fulfil the show zoom ratio ZD is set now to be the fit-to-screen zoom ratio ZF determined in stage 503. It is now 11%. This action is taken care of program code means 31.9. Next in stage 507 the image IM is shown on the screen 11 by using the show zoom ratio ZD set in previous stage 506.1 (program code means 31.2). The size difference between size of the image object IO is now considerable. Owing to the invention the difference Z' in the zooming effect is now clearly noticeable for the user and image viewing experience is enjoyable.

Figure 6B:
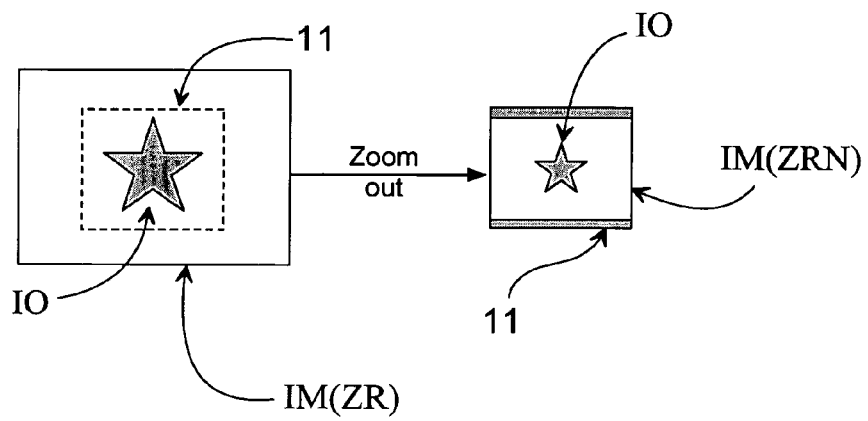
Figure 7:
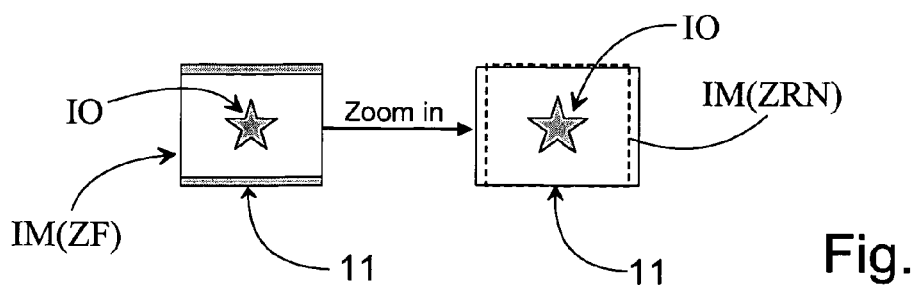

However, if in the comparison stage 505 would have been noticed by the processor 12 (program code means 31.3) that the difference Z' between fit-to-screen zoom ratio ZF and the next smaller default zoom ratio ZRN (12,5%) is clear, i.e. over the threshold set for that (now 30%) then a step to the stage 506.2 would be performed. The application example of this is presented in FIG. 6b. In this case the skipping of the next default zoom ratio according to the stage 506.1 would be caused too large difference to the zooming effect. In the stage 506.2 for the image IM is set the show zoom ratio ZD depending on the selected zooming direction. Since the zooming direction is now zoom-out of the image IM and the condition of the stage 505 didn't fulfil the show zoom ratio ZD is set now to be 12,5% being the next smaller default zoom ratio ZRN in the selected zooming order. Next in stage 507 the image IM(ZRN) is shown on the screen 11 by using the show zoom ratio ZD set for it in stage 506.2.

If the invention is used, the user does not have to wait unnecessarily for a very small zoom difference, but would get a significant difference each time when the user zooms image IM on the screen 11 of the device 10. This is particularly relevant when viewing, for example, the images having megapixel magnitude on the displays having their vertical/horizontal resolution magnitude of couple of hundreds pixels in each direction. In general, viewing this kind of images on the screen of such resolution properties the zoom difference is very often quite small between fit-to-screen and "easy" default zoom ratio near to it.

One application example of this kind of image/screen combination is when viewing, for example, two megapixel images on display having resolution, for example, 176×208 or 352×416. In these cases the relative zoom difference Z' is always small between the fit-to-screen ZF and the "easy" default zoom ratio which is next to or at least near of the fit-to-screen zoom ratio ZF.

In FIG. 1 is presented a rough schematic view of an application example of a program product 30 according to the invention. The program product 30 may include memory medium MEM and a program code 31 executable by the processor unit 12 of the device 10 and written in the memory medium MEM for dealing out zooming procedure in accordance with the method of the invention at least partly in the software level. The memory medium MEM for the program code 31 may be, for example, a memory card adaptable in connection with portable device 10 or also a static or dynamic application memory of the device 10, wherein it can be integrated directly in connection with the image viewing application 34.

The program code 31 may include several code means 31.1-31.9 described above, which can be executed by processor 12 and the operation of which can be adapted to the method descriptions just presented above. The code means 31.1-31.9 may form a set of processor commands executable one after the other, which are used to bring about the functionalities desired in the invention in the equipment 10 according to the invention.

Although, the invention has been described in the above in zoom-in embodiments in which first is made the fit-to-screen operation, of course, it is also possible to skip the fitting of the image IM to the screen 11. If the algorithm 31 detects when performing opening of the image IM that the fit-to-screen zoom ratio ZF and the default zoom ratio next to it are very closely the invention may instructs to use this default zoom ratio instead of the fit-to-screen zoom ratio ZF.

The invention above is described in connection with the image which format is JPEG (Joint Photographic Experts Group). JPEG is just one example of an image format making possible such fast opening sizes like ⅛, ¼ and half of the size of the original image. In that scaling the easiness is caused by the fact that the average value is calculated from the pixels (<100% scaling) or pixels are duplicated (>100% scaling). Due to this reason the viewed image needs not to be JPEG in order to get advantage from the invention.

Thus, of course, for one versed in the art, there may also be other image format for which the default zoom ratio values may be different or even there may be not them at all (arbitrary zoom ratio being some real number value chosen by the device 10 or by the user). The fact that the image IM may be fit to the screen 11 tells that the default zoom ratio or, in general, the next possible zoom ratio that is intended to use when performing image viewing, may have any value that may also be outside of the any special sets of values DZR_IN, DZR_OUT. In the case of fit to screen the zoom ratio ZF of the image IM may be any real number value. This indicates that the "default zoom ratio" DZR_IN, DZR_OUT may also have any real number value.

Yet, according to one embodiment, when the arbitrary zoom ratios without any special order or increase method are applied, the device 10 itself can calculate such a suitable show zoom ratio ZD to be used. Thus, in this kind of solution there are not any special default zoom ratios according to which the zooming is performed. Starting the zooming operation from the fit-to-screen zoom ratio ZF, the user may have been chosen to be used as next such a zoom ratio, which is too close to the current fit-to-screen zoom ratio ZF. When this difference ZX between fit-to-screen zoom ratio ZF and the next suggested zoom ratio is recognized the device 10 will calculate by its processor 12 such a zoom ratio by using of which is achieved such increase ZX in the zooming that is noticeable in the view of the user.

From all pixel multiples it is possible to calculate average value which can be used as the user interface/the default zoom ratios DZR_IN, DZR_OUT.

At least next pixel amounts are also "easy" ones. Thus, in general, 1/n -equation is used (n=2:50%, n=3:33,3%, n=4: 25%, n=5:20%, n=6:16,7%, etc.).

When performing zoom in procedure the other "easy" ratios functions quite nicely. In this case, for example, one pixel is duplicated to be many. Thus, in general, 1n -equation is used (n=2:200%, n=3:300%, n=4:400%, n=5:500% etc.).

In the both exemplary cases above the zooming effect will decrease when zooming procedure using these ratios will go further. This is due to the difference between consecutive zoom ratios (1/n−1/(n+1)/(1/n)) that decreases when the integer value n increases. This may cause the harmful effect when using the method according to the invention. In such case the relative difference between fit-to-screen zoom ratio ZF and next user interface zoom ratio (n+1) intended to be use may be too small between two consecutive default zoom ratios between which the fit-to-screen zoom ratio ZF will be set up. More precisely, the difference between default zoom ratio 1/n and fit-to-screen zoom ratio ZF and also the difference between next zoom ratio 1/(n+1) and fit-to-screen zoom ratio ZF may be both below the threshold value ZX set for the required difference Z'. This may cause, if the invention is implemented, that in the both cases the fit-to-screen zoom ratio ZF is used as show zoom ratio ZD to show the image IM in question.

One solution to solve this annoying effect is to skip some default zoom ratios presented above. One exemplary group of the default zoom ratios DZR_IN may be, for example, 1:100%, ⅓:33%, ⅑:11%, 1/27:3,7%. From these examples above, the skilled person will observe that there are even several possibilities to implement the concerned invention.

As such, the zoom ratios DZR_IN, DZR_OUT to be used in the zooming of the image may be any kind of values without any particular established order or step. This is possible because the original image format doesn't need to prescribe which zooming values are used in the user interface. The difference Z' between fit-to-screen zoom ratio ZF and the next zoom ratio suggested to be used is important. Based on this difference Z' is selected the most user-friendly show zoom ratio SD which makes the viewing experience very enjoyable, user-friendly and non-frustrating.

It should be understood that the above specification and the figures relating to it are only intended to illustrate the present invention. Thus, the invention is not limited only to the embodiments presented above or to those defined in the claims, but many various such variations and modifications of the invention will be obvious to the professional in the art, which are possible within the scope of the inventive idea defined in the appended claims.

What is claimed is:

1. Electronic device, comprising
a screen to show an image by using a show zoom ratio and
a processor to perform zooming of the image in a selected zooming direction in order to show the image on the display, said processor being configured to determine a fit-to-screen zoom ratio to fit the image on the display and wherein part of the possible show zoom ratios are arranged to form default zoom ratios changing in a set manner in order to deal out successive zooming operations in the selected zooming direction, and wherein the processor is configured to determine the difference between the fit-to-screen zoom ratio and a next default zoom ratio in the selected zooming direction, and set in the show zoom ratio based at least partly on the difference and the zooming direction.

2. Electronic device according to claim 1, wherein the selected zooming operation is zoom-in of the image.

3. Electronic device according to claim 2, wherein the default zoom ratios comprise zoom ratios that are achieved by duplicating of the pixels of the image and which are form, for example, $2^n:1$, in which =0, 1, 2, 3, . . .

4. Electronic device according to claim 1, wherein the selected zooming operation is zoom-out of the image.

5. Electronic device according to claim 4, wherein the default zoom ratios comprise zoom ratios that are achieved by calculating an average of the pixels of the image and which are form, for example, $1:2^n$, in which n=0, 1, 2, 3, . . .

6. Electronic device according to claim 1, configured to set a threshold value for the said difference which threshold value is arranged to be 1-50%, such as, for example, 10-45%, or even more precisely 25-35%.

7. Electronic device according to claim 2, wherein if the difference is below the threshold value,
the device is configured to use such default zoom ratio which is greater in order than the default zoom ratio which is the next in the selected zooming direction as the show zoom ratio, otherwise
the device is configured to use the default zoom ratio which is the next in the selected zooming direction as the show zoom ratio.

8. Electronic device according to claim 4, wherein if the difference is below the threshold value,
the device is configured to use the determined fit-to-screen zoom ratio as the show zoom ratio, otherwise
the device is configured to use the default zoom ratio which is the next in the selected zooming direction as the show zoom ratio.

9. Method comprising
determining a fit-to-screen zoom ratio for the image that is used for fitting the image on the screen,
setting is set the show zoom ratio for the image depending on the selected zooming direction and
showing the image on the screen using the show zoom ratio,
wherein part of the possible show zoom ratios form default zoom ratios changing in a set manner to deal out successive zooming operations of the image in a selected zooming direction, the method further comprising determining the difference between the fit-to-screen zoom ratio and the next default zoom ratio in the selected zooming direction in connection with the zooming operation and setting said show zoom ratio based at least partly on the difference and the zooming direction.

10. Method according to claim 9, wherein the selected zooming operation is zoom-in of the image.

11. Method according to claim 9, wherein the default zoom ratios comprise zoom ratios that are achieved by duplicating of the pixels of the image and which are form, for example, $2^n:1$, in which =0, 1, 2, 3, . . .

12. Method according to claim 9, wherein the selected zooming operation is zoom-out of the image.

13. Method according to claim 9, the default zoom ratios comprise zoom ratios that are achieved by calculating an average of the pixels of the image and which are form, for example, $1:2^n$, in which n=0, 1, 2, 3, . . . .

14. Method according to claim 9, comprising setting threshold value for the said difference which threshold value is 1-50%, such as, for example, 10-45%, or even more precisely 25-35%.

15. Method according to claim 10, wherein if the difference is below the threshold value, such default zoom ratio is used as the show zoom ratio which is greater in order than the default zoom ratio which is the next in the selected zooming direction, otherwise the default zoom ratio is used as the show zoom ratio which is the next in the selected zooming direction.

16. Method according to claim 12, wherein if the difference is below the said threshold value, the determined fit-to-screen zoom ratio is used as the show zoom ratio, otherwise the default zoom ratio is used as the show zoom ratio which is the next in the selected zooming direction.

17. Program product comprising a storing means and a program code executable by processor and written in the storing means, which program code performs determining such a fit-to-screen zoom ratio for the image that is used for fitting the image on a screen, showing the image on the screen by using the set show zoom ratio, in which part of the possible show zoom ratios are arranged to form default zoom ratios changing in a set manner to deal out successive zooming operations in a selected zooming direction, the program code being further configured to determine the difference between the fit-to-screen zoom ratio and the next default zoom ratio in the selected zooming direction and to set the show zoom ratio based at least partly on the difference and the zooming direction.

18. Program product according to claim 17, wherein the selected zooming operation is zoom-in of the image and the program code is configured to form the default zoom ratios of zoom ratios that are achieved by duplicating of the pixels of the image and which are form, for example, $2^n:1$, in which $=0, 1, 2, 3, \ldots$

19. Program product according to claim 17, wherein the selected zooming operation is zoom-out of the image and the program code is configured to form the default zoom ratios of zoom ratios that are achieved by calculating an average of the pixels of the image and which are form, for example, $1:^n$, in which $n=0, 1, 2, 3, \ldots$

20. Program product according to claim 17, wherein the program code is configured to set a threshold value for the difference which threshold value is arranged to be 1-50%, such as, for example, 10-45%, or even more precisely 25-35%.

21. Program product according to claim 17, wherein if the said difference is below the threshold value the program code is configured to use such default zoom ratio as the show zoom ratio which is greater in order than the default zoom ratio which is the next in the selected zooming direction, otherwise to use the default zoom ratio as the show zoom ratio which is the next in the selected zooming direction.

22. Program product according to claim 17, wherein if the difference is below the threshold value, the program code is configured to use the determined fit-to-screen zoom ratio as the show zoom ratio, otherwise to use the default zoom ratio as the show zoom ratio which is the next in the selected zooming direction.

23. Electronic device, comprising a screen configured to show an image by using the set show zoom ratio and a processor configured to perform zooming of the image in a selected zooming direction in order to show the image on the screen, in which zooming operation the device is configured to determine a such of fit-to-screen zoom ratio that is used for fitting the image on the screen and in which part of the possible show zoom ratios are arranged to form default zoom ratios changing in a set manner in order to deal out successive zooming operations in the selected zooming direction, wherein the processor is configured to determine the difference between the fit-to-screen zoom ratio and the next default zoom ratio in the selected zooming direction and to set the show zoom ratio based on the difference and the zooming direction.

* * * * *